Aug. 13, 1929.  B. S. HARRISON  1,724,196
CORE DRIER
Filed Sept. 26, 1927
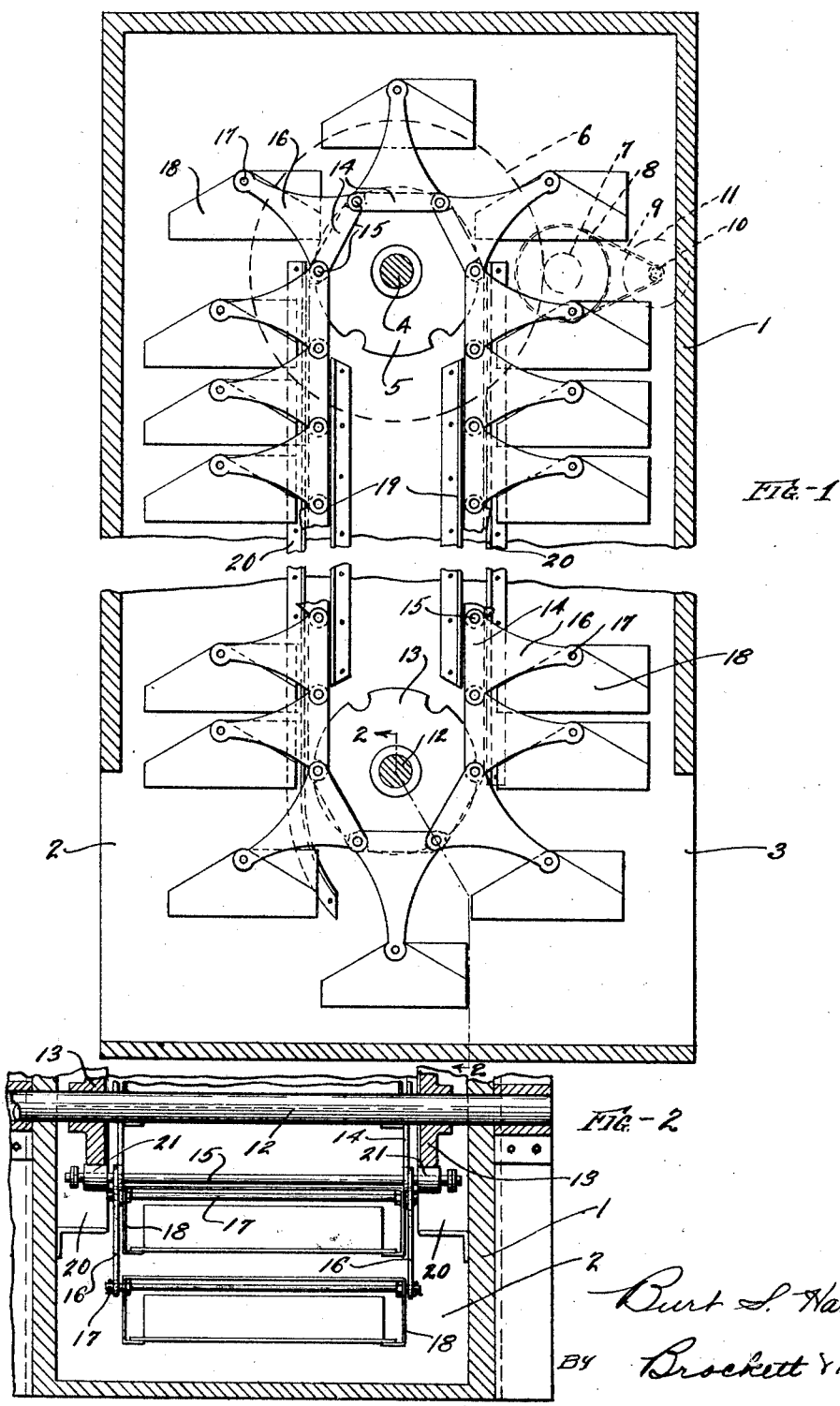

Patented Aug. 13, 1929.

1,724,196

UNITED STATES PATENT OFFICE.

BURT SYLVANUS HARRISON, OF CLEVELAND, OHIO.

CORE DRIER.

Application filed September 26, 1927. Serial No. 222,087.

This invention relates to core driers and particularly to that type employing trays or containers for cores.

Heretofore core driers have been made wherein a suitable oven is provided with a flexible conveyor making various turns within the oven and ultimately presenting the cores at a suitable discharge point. In most of these cases the containers have been in the form of trays mounted to swing upon centers coincident, or substantially so with respect to the path of the conveyor or chain, in which case it is necessary to so space the supporting means for the trays, to such an extent, that at the turns there will be sufficient clearance to permit the trays to swing free of each other and free of the cores carried thereby, resulting in loss of efficiency and increase in the size of the oven and the entire plant.

The present invention aims to overcome this difficulty by providing an oven with preferably a vertically disposed conveyor in the form of an endless chain, for example, travelling about driving and supporting sprockets, and equipping these chains with outwardly projecting container or tray supporting arms spaced as close as possible along the conveyor or chain with no greater clearance therebetween than is necessary for the movements of the trays and their load as they move along a straight course and of such length, that on the turns, they will move apart at their outer end and space the containers or trays sufficiently to permit them to swing free of each other in making the turn. This construction, as before indicated, results in the reduction in the size of the plant without a sacrifice of efficiency or output.

Other features of the invention will be brought out in the following description, drawings and claim, wherein Fig. 1 is a vertical section of a drier constructed according to my invention and Fig. 2 is a section upon the line 2—2 of Fig. 1, looking in the direction of the arrow.

In the arrangement shown in the drawings, 1 represents a suitable oven heated in any preferred manner and provided with a suitable charging opening 2 and a discharging opening 3 by means of which the cores may be placed upon the containers or trays and removed therefrom after treatment.

Within this oven the conveyor and tray or container arrangement is mounted and it comprises an upper shaft 4 supporting suitably spaced sprockets 5. This shaft 4 may be driven in any suitable manner as by the indicated gearing comprising a gear 6 secured to the shaft 4, a driving pinion 7, a chain wheel 8 in driving relation with the pinion 7 and driven through a chain 9 from a driving sprocket 10 operated by a motor 11. The gearing is preferably mounted outside of the oven and forms no special part of the invention, but merely serves as an operating means for the conveyor.

Mounted in the lower part of the casing is another shaft 12 carrying spaced sprockets 13. The sprockets 5 and 13 are arranged in upper and lower pairs and each pair is provided with a chain comprising links 14 pivoted together as at 15. Secured to these links or forming a part of each link, if long enough, are suitable container supporting arms 16 projecting outwardly from the conveyor and carrying a suitable shaft 17 upon which is swung a suitable container or tray 18. The arms 16 are preferably spaced along the conveyor in a manner such that the containers or trays and their loads clear each other or just miss, as shown, so that on vertical flights of the conveyor the containers or trays are close together. In fact, so close that they would interfere if they were not further spaced at the turn, but by providing the arm 16, projecting from the conveyors, the trays or containers are swung at the turns free and clear of each other so that no interference results.

To maintain the vertical flights of the conveyors in vertical position, suitable rails 19 and 20 are provided on opposite sides of the conveyor or chain and these engage suitable rollers 21 arranged upon the pivots 15 of the chain. These rails conduct the portions of the conveyors or chains directly to their sprockets, as shown.

In use, the apparatus is charged by the operator placing the cores through the opening 2 upon the containers or trays, the movement of these containers or trays being very slow. The trays or containers then move upward on the left hand side, as shown in Fig. 1, and when they reach the top the arms swing them apart so that they clear without difficulty and pass down the opposite side where the cores are removed through the opening 3.

What I claim is:

In a device of the character described, core conveying mechanism of endless form, comprising two series of rigid links spaced in parallel relation with the links of each series connected end to end by pivotal joints, each link of each series being provided with a laterally extending arm of greater length than the distance between the pivotal joints of said link, each arm of one series being connected to an arm of the other series and each pair of arms so connected being provided with a core receiving container, each pivotal joint of each link being provided with an anti-friction roller movable between and contacting with spaced guide rails, whereby said core receiving containers are firmly supported by said arms.

In testimony whereof I hereby affix my signature.

BURT SYLVANUS HARRISON.